US008223962B2

(12) United States Patent
Konuma (10) Patent No.: US 8,223,962 B2
(45) Date of Patent: Jul. 17, 2012

(54) COMMON KEY GENERATION SYSTEM, COMMON KEY GENERATION METHOD AND NODE USING THE SAME (75) Inventor: Ryouhei Konuma, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 858 days.

(21) Appl. No.: 12/260,203

(22) Filed: Oct. 29, 2008

(65) Prior Publication Data
US 2009/0129590 A1 May 21, 2009

(30) Foreign Application Priority Data
Nov. 20, 2007 (JP) ................................. 2007-300385

(51) Int. Cl.
*H04L 9/00* (2006.01)
(52) U.S. Cl. ......................................... 380/44; 380/259
(58) Field of Classification Search .................... 380/44, 380/277, 28, 259, 262, 286
See application file for complete search history.

(56) References Cited

U.S. PATENT DOCUMENTS

| 5,191,614 | A  | * | 3/1993  | LeCong ......................... 380/256 |
| 6,779,111 | B1 | * | 8/2004  | Gehrmann et al. ............. 713/171 |
| 7,147,563 | B2 | * | 12/2006 | Miura et al. ..................... 463/42 |
| 7,471,790 | B2 | * | 12/2008 | Yoshida et al. ................. 380/28 |
| 7,603,557 | B2 | * | 10/2009 | Zhang et al. ................... 713/170 |
| 7,647,366 | B2 | * | 1/2010  | Meintrup et al. ............. 708/250 |
| 7,757,085 | B2 | * | 7/2010  | Lyle .............................. 713/169 |
| 7,822,204 | B2 | * | 10/2010 | Yoshida et al. ............... 380/268 |
| 2003/0061516 | A1 | * | 3/2003  | Yamaguchi et al. ........... 713/201 |
| 2004/0252836 | A1 | * | 12/2004 | Yoshida et al. ............... 380/268 |
| 2005/0054355 | A1 | * | 3/2005  | Saitou et al. ................... 455/463 |
| 2005/0097314 | A1 | * | 5/2005  | Matsushima .................. 713/156 |
| 2006/0056624 | A1 | * | 3/2006  | Ishiguro et al. ................. 380/46 |
| 2007/0110226 | A1 | * | 5/2007  | Ogata .............................. 380/28 |
| 2007/0183593 | A1 | * | 8/2007  | Yoshida et al. ................. 380/28 |
| 2008/0044011 | A1 | * | 2/2008  | Yoshida et al. ................. 380/28 |
| 2008/0143561 | A1 | * | 6/2008  | Miyato et al. ................... 341/79 |
| 2008/0155257 | A1 | * | 6/2008  | Werner et al. ................. 713/168 |
| 2009/0043681 | A1 | * | 2/2009  | Shoji et al. ....................... 705/35 |
| 2009/0052745 | A2 | * | 2/2009  | Sathath ......................... 382/115 |

FOREIGN PATENT DOCUMENTS
JP 3707660 B2 10/2005
* cited by examiner

*Primary Examiner* — Kim Vu
*Assistant Examiner* — Sayed Beheshti Shirazi
(74) *Attorney, Agent, or Firm* — Marvin A. Motsenbocker; Mots Law, PLLC (57) ABSTRACT

First and second nodes generate numeric string elements from time interval by their physical changes. The first node generates a basic numeric string from the numeric string elements and similar numeric strings, encrypts the generated basic numeric string and the similar numeric strings, and generates a cipher value list that stores the numeric strings with corresponding cipher values. The second node generates a basic numeric string based on the numeric string elements generated by the second node, encrypts the generated basic numeric string in accordance with the same encryption rule as that for the first node, and transmits the generated cipher value to the first node. The first node receives a cipher value from the second node, and compares the received cipher value with the cipher values in the cipher value list to find a match, and transmits a match signal if a match is found.

19 Claims, 9 Drawing Sheets

PROCESS FLOW ACCORDING TO FIRST EMBODIMENT

FIG. 1

VIEW SHOWING GENERAL CONFIGURATION OF NODES USING A COMMON KEY GENERATION METHOD ACCORDING TO FIRST EMBODIMENT

FIG. 2

FUNCTIONAL BLOCK DIAGRAM OF PARENT NODE ACCORDING TO FIRST EMBODIMENT

FIG. 5

SCHEMATIC VIEW SHOWING TIME INTERVALS BETWEEN TURN-ON OPERATIONS OF SWITCHES BY COLLISIONS BETWEEN PARENT NODE AND CHILD NODE ACCORDING TO FIRST EMBODIMENT

FIG. 6

(a) DATA FORMAT OF PACKET

| SOURCE ADDRESS | DESTINATION ADDRESS | DATA PORTION |
|---|---|---|

(b) PACKET A
(FROM PARENT NODE TO CHILD NODE)

| ADDRESS OF PARENT NODE | — | COLLISION START NOTIFICATION SIGNAL |
|---|---|---|

(c) PACKET B
(FROM CHILD NODE TO PARENT NODE)

| ADDRESS OF CHILD NODE | ADDRESS OF PARENT NODE | COLLISION READY SIGNAL |
|---|---|---|

(d) PACKET C
(FROM PARENT NODE TO CHILD NODE)

| ADDRESS OF PARENT NODE | ADDRESS OF CHILD NODE | COLLISION END NOTIFICATION SIGNAL |
|---|---|---|

FIG. 7

| | STRING | CIPHER VALUE |
|---|---|---|
| BASIC STRING b0 OBTAINED BY COLLISION | 52164 | c0 |
| SIMILAR STRING b1 GENERATED BY REDUCING LEAST SIGNIFICANT DIGIT BY 1 | 52163 | c1 |
| SIMILAR STRING b2 GENERATED BY INCREASING LEAST SIGNIFICANT DIGIT BY 1 | 52165 | c2 |
| SIMILAR STRING b3 GENERATED BY REDUCING SECOND LEAST SIGNIFICANT DIGIT BY 1 | 52154 | c3 |
| SIMILAR STRING b4 GENERATED BY INCREASING SECOND LEAST SIGNIFICANT DIGIT BY 1 | 52174 | c4 |
| SIMILAR STRING b5 GENERATED BY REDUCING THIRD LEAST SIGNIFICANT DIGIT BY 1 | 52064 | c5 |
| SIMILAR STRING b6 GENERATED BY INCREASING THIRD LEAST SIGNIFICANT DIGIT BY 1 | 52264 | c6 |
| SIMILAR STRING b7 GENERATED BY REDUCING FOURTH LEAST SIGNIFICANT DIGIT BY 1 | 51164 | c7 |
| SIMILAR STRING b8 GENERATED BY INCREASING FOURTH LEAST SIGNIFICANT DIGIT BY 1 | 53164 | c8 |
| SIMILAR STRING b9 GENERATED BY REDUCING MOST SIGNIFICANT DIGIT BY 1 | 42164 | c9 |
| SIMILAR STRING b10 GENERATED BY INCREASING MOST SIGNIFICANT DIGIT BY 1 | 62164 | c10 |

| BASIC STRING "d" OF CHILD NODE = 52264 | CIPHER VALUE "f" |
|---|---|

TABLE SHOWING CIPHER VALUE LIST GENERATED BY PARENT NODE ACCORDING TO FIRST EMBODIMENT

FIG. 8

| TIME RATIO tn ($p_{n+1}/p_n$) | NUMERIC STRING ELEMENT |
|---|---|
| LESS THAN 0.5 | 00 |
| BETWEEN 0.5 INCLUSIVE AND 1.0 EXCLUSIVE | 01 |
| BETWEEN 1.0 INCLUSIVE AND 2.0 EXCLUSIVE | 11 |
| 2.0 OR MORE | 10 |

TABLE SHOWING EXAMPLE OF STRING ELEMENT GENERATION RULE USED IN SECOND EMBODIMENT

FIG. 9

| NUMERIC STRING ELEMENT | PARENT NODE | | CHILD NODE | |
|---|---|---|---|---|
| | TIME RATIO tn ($p_{n+1}/p_n$) | CODE | TIME RATIO tn ($q_{n+1}/q_n$) | CODE |
| n1 | 0.3 | 00 | 0.3 | 00 |
| n2 | 0.9 | 01 | 1.0 | 11 |
| n3 | 3.3 | 10 | 3.3 | 10 |
| n4 | 0.7 | 01 | 0.7 | 01 |

TABLE SHOWING STRING ELEMENTS OBTAINED BY APPLICATION OF FIG. 8

FIG. 10

| | STRING | ENCRYPTION VALUE |
|---|---|---|
| NUMERIC STRING bb0 OBTAINED BY COLLISION | 00011001 | cc0 |
| SIMILAR NUMERIC STRING bb1 GENERATED BY SUBSTITUTING NUMERIC STRING ELEMENT n4 | 00011000 | cc1 |
| SIMILAR NUMERIC STRING bb2 GENERATED BY SUBSTITUTING NUMERIC STRING ELEMENT n4 | 00011011 | cc2 |
| SIMILAR NUMERIC STRING bb3 GENERATED BY SUBSTITUTING NUMERIC STRING ELEMENT n3 | 00011101 | cc3 |
| SIMILAR NUMERIC STRING bb4 GENERATED BY SUBSTITUTING NUMERIC STRING ELEMENT n2 | 00001001 | cc4 |
| SIMILAR NUMERIC STRING bb5 GENERATED BY SUBSTITUTING NUMERIC STRING ELEMENT n2 | 00111001 | cc5 |
| SIMILAR NUMERIC STRING bb6 GENERATED BY SUBSTITUTING NUMERIC STRING ELEMENT n1 | 01011001 | cc6 |

BASIC NUMERIC STRING "dd" OF CHILD NODE = 00111001 | CIPHER VALUE "ff"

TABLE SHOWING CIPHER VALUE LIST GENERATED BY PARENT NODE ACCORDING TO SECOND EMBODIMENT

FIG. 11

ILLUSTRATION OF SUBSTITUTION RULE BASED ON GRAY CODE ACCORDING TO SECOND EMBODIMENT

FIG. 12

| TIME RATIO tn ($p_{n+1}/p_n$) | NUMERIC STRING ELEMENT |
|---|---|
| LESS THAN 0.3 | 000 |
| BETWEEN 0.3 INCLUSIVE AND 0.6 EXCLUSIVE | 001 |
| BETWEEN 0.6 INCLUSIVE AND 0.9 EXCLUSIVE | 011 |
| BETWEEN 0.9 INCLUSIVE AND 1.2 EXCLUSIVE | 010 |
| BETWEEN 1.2 INCLUSIVE AND 1.5 EXCLUSIVE | 110 |
| BETWEEN 1.5 INCLUSIVE AND 1.8 EXCLUSIVE | 111 |
| BETWEEN 1.8 INCLUSIVE AND 2.1 EXCLUSIVE | 101 |
| 2.1 OR MORE | 100 |

TABLE SHOWING EXAMPLE OF STRING ELEMENT GENERATION RULE WHICH IS 3 BITS LONG

COMMON KEY GENERATION SYSTEM, COMMON KEY GENERATION METHOD AND NODE USING THE SAME

CROSS REFERENCE TO RELATED APPLICATIONS

This application claims priority based on 35 USC 119 from prior Japanese Patent Application No. P2007-300385 filed on Nov. 20, 2007, entitled "COMMON KEY GENERATION SYSTEM, COMMON KEY GENERATION METHOD AND NODE USING THE SAME" the entire contents of which are incorporated herein by reference.

BACKGROUND OF THE INVENTION

1. Field of the Invention

The present invention relates to technology for generating and sharing a common key that is common to nodes (or separate pieces of equipment) having a radio communication function to carry out radio communication based on common key cryptography, without a third party intercepting the communication.

2. Description of the Related Art

Heretofore, as a method for generating a common key, a method involves: making the same physical change in two nodes that desire cipher communication; producing shared information common to the nodes based on the physical change; and generating a common key based on the shared information. For example, Japanese Patent No. 3707660 (an eighth embodiment) discloses the following method for generating a common key. In this method, each of the two nodes is provided with a pushbutton, respectively, and information common to the nodes (e.g., the number of button presses and the timing of button press (i.e., the time interval between button presses)) is obtained by a user pressing down the pushbuttons at the nodes in the same pattern of operation. Then, a common key is generated based on this common information. According to this method, on the occasion of cipher communication between nodes, the nodes, even if not holding a common key in advance, can generate a common key and use the common key for the cipher communication.

However, the method disclosed in Japanese Patent No. 3707660 can possibly produce a situation where, even if a user can operate the pushbuttons properly at predetermined times at each of the nodes, individual pieces of information detected at each of the nodes may be different because an error occurs in sensors of the nodes that detect this operation during a sampling process. In this situation, the same common key may not be generated at each node. Although it is rare for such a situation to arise, the same common key is not always generated at each node.

Specifically, clocks of the nodes measure lengths of time for "on" and "off" conditions of the pushbuttons provided in the nodes, and the common key is generated based on the lengths of time. However, if some deviation occurs between each of the measurement clocks of the nodes, the lengths of time measured by the clocks will differ from each other. In this case, it is likely that the same common key could not be generated.

More specifically, for instance in FIG. 31 of Japanese Patent No. 3707660, if a communication device (a node) A has a timing pattern that would be "49" and a communication device (a node) B has another timing pattern that would be "50", there is a mismatch between common keys generated respectively by communication devices A and B.

SUMMARY OF THE INVENTION

The present invention has been made in consideration of the above-described problems inherent in the related art. It is an object of the present invention to provide a common key generation system, a common key generation method and a node using the same, which can accept an error in measurement due to a physical change and which enables nodes to stably generate and share a common key.

An aspect of the invention provides a common key generation system that comprises: a first node including: a numeric string element generator configured to generate one or more numeric string elements from time interval information of a physical change in the first node; a numeric string generator configured to generate a basic numeric string from the one or more numeric string elements and substitute the basic numeric string with one or more similar numeric strings; an encryption unit configured to encrypt the basic numeric string and the one or more similar numeric strings and to generate a cipher value list of the numeric strings in correspondence with their cipher values; and a match signal judgment unit configured to search a received cipher value from the cipher value list, and a second node including: a numeric string element generator configured to generate one or more numeric string elements from time interval information of a physical change in the second node; a numeric string generator configured to generate a basic numeric string from the one or more numeric string elements; an encryption unit configured to encrypt the basic numeric string in accordance with the encryption rule, which is common to that for the first node; and a transmitter configured to transmit the generated cipher value to the first node, which is recognized as the received cipher value at the first node, wherein the match signal judgment unit searches for the cipher value transmitted from the transmitter of the second node, and a common key is generated based on the result of the search.

This permits measurement error due to physical change in each of the two nodes, thus enabling the nodes to stably generate and share the common key.

Another aspect of the invention provides a common key generation system for cipher communication that comprises: a first node including: a numeric string element generator configured to detect time intervals between physical changes made to the first node in time series, and generates one or more numeric string elements from the detected time interval values in accordance with a predetermined numeric string element generation rule; a numeric string generator configured to generate a basic numeric string from the one or more numeric string elements generated by the numeric string element generator, and to generate one or more similar numeric strings by incrementing or decrementing, by a predetermined value x (where x=1, 2, ..., n), the least significant digit of each numeric string element that constitutes the basic numeric string; an encryption unit configured to encrypt each generated basic numeric string and one or more similar numeric strings and to generate a cipher value list that stores the numeric strings in correspondence with their cipher values; a cipher value search unit configured to receive a cipher value, and compare the received cipher value with the cipher value list to determine a match in the cipher value list; and a transmitter configured to transmit a match signal upon finding a match, and a second node including: a numeric string element generator configured to detect a time interval between pairs of physical changes made to the first node in time series, and to generate one or more numeric string elements from the detected time interval values in accordance with a predetermined numeric string element generation rule; a numeric string generator configured to generate a basic numeric string from the one or more numeric string elements generated by the numeric string element generator; an encryption unit configured to encrypt the generated basic numeric string into the cipher value in accordance with the same encryption rule as that for the first node; a transmitter configured to transmit the cipher value to the first node, and a receiver configured to receive the match signal from the first node, wherein, when the cipher value search unit finds a match, the first node selects the basic numeric string generated by the first node as the common key, or, when the second node receives the match signal from the first node, the second node selects the basic numeric string generated by the second node as the common key.

Still another aspect of the invention provides a common key generation system that comprises: a first node including: a numeric string element generator configured to detect a time interval value between pairs of physical changes made to the first node in time series, determine ratios between adjacent time interval values, and transform the ratios in accordance with a predetermined numeric coding rule to thereby generate one or more numeric string elements; a numeric string generator configured to generate a basic numeric string from the one or more numeric string elements generated by the numeric string element generator, and to generate one or more similar numeric strings by substituting each numeric string element that constitutes the basic numeric string, with an adjacent sign in accordance with the numeric coding rule; an encryption unit configured to encrypt the generated basic numeric string and the one or more similar numeric strings and to generate a cipher value list of one or more numeric strings with their cipher values; a cipher value search unit configured to receive a cipher value, and to look for a match between the received cipher value and a cipher value in the cipher value list; and a transmitter configured to transmit a match signal when the cipher value search unit finds a match, and a second node including: a numeric string element generator configured to detect a time interval value between pairs of physical changes made to the first node in time series, to determine a ratio between adjacent time interval values, and to transform the time ratios in accordance with the predetermined numeric coding rule to thereby generate one or more numeric string elements; a numeric string generator configured to generate a basic numeric string from the one or more numeric string elements generated by the numeric string element generator; an encryption unit configured to encrypt the generated basic numeric string into the cipher value in accordance with the same encryption rule as that for the first node; a transmitter configured to transmit the cipher value to the first node, and a receiver configured to receive the match signal from the first node, wherein, if the cipher value search unit finds a match in the first node, the first node selects the basic numeric string generated by the first node as the common key, or, if the second node receives the match signal from the first node, the second node selects the basic numeric string generated by the second node as the common key.

Still another aspect of the invention provides a common key generation method comprising the steps of: making physical changes in first and second nodes that are in communication; and executing a numeric string element generation process by which each of the first and second nodes generates one or more numeric string elements from time interval information on the changes, wherein the first node: generates a basic numeric string from the one or more numeric string elements generated by the first node, and substitute the basic numeric string with one or more similar numeric strings; encrypts the generated basic numeric string and one or more similar numeric strings, and generates a cipher value list that stores the numeric strings with corresponding cipher values; receives a cipher value from the second node of the first and second nodes, and comparing the received cipher value with the cipher values in the cipher value list to find a match; and transmits a match signal to the second node and determining, as a common key, the numeric string corresponding to the cipher value matching the received cipher value, if a match is found, and the second node: generates a basic numeric string based on the one or more numeric string elements generated by the second node; encrypts the generated basic numeric string in accordance with the same encryption rule as that for the first node; transmits the generated cipher value to the first node; and selects the basic numeric string generated by the second node as the common key, if the second node receives the match signal from the first node.

Still another aspect of the invention provides a node applicable to a common key generation system employing common key between nodes that comprises: a numeric string element generator configured to generate one or more numeric string elements from time interval information of a physical change in the node; a numeric string generator configured to generate a basic numeric string from the one or more numeric string elements and substitute the basic numeric string with one or more similar numeric strings; an encryption unit configured to encrypt the basic numeric string and the one or more similar numeric strings and to generate a cipher value list of the numeric strings in correspondence with their cipher values; and a match signal judgment unit configured to search a received cipher value from the cipher value list.

Still another aspect of the invention provides a node applicable to a common key generation system employing common key between nodes that comprises: a numeric string element generator configured to generate one or more numeric string elements from time interval information of a physical change in the second node; a numeric string generator configured to generate a basic numeric string from the one or more numeric string elements; an encryption unit configured to encrypt the basic numeric string in accordance with the encryption rule, which is common to that for the first node; and a transmitter configured to transmit the generated cipher value to the first node, which is recognized as the received cipher value at the first node, wherein the match signal judgment unit searches for the cipher value transmitted from the transmitter of the second node, and a common key is generated based on the result of the search.

The following embodiments describe an embodiment where collision occurs between switches provided in the nodes, as a means for causing plural physical changes in the nodes in time series. However, the means is not limited to this. For example, the physical change may involve a change in any one of light, sound, wind power, temperature and humidity.

DETAILED DESCRIPTION OF THE PREFERRED EMBODIMENTS

Detailed description will be given with reference to the drawings with regard to embodiments of the present invention.

First Embodiment

Figure 1:
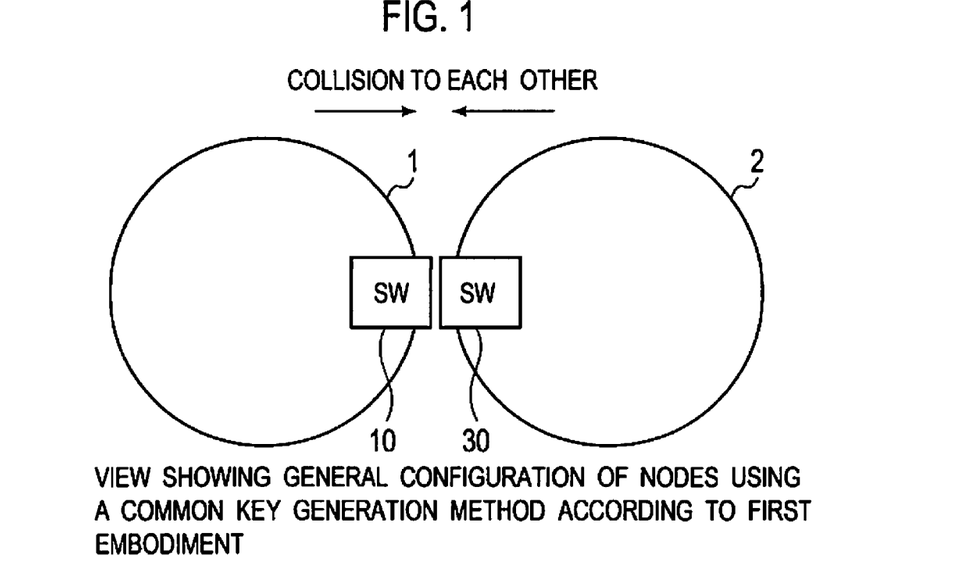
FIG. 1 is a view showing general configuration of a node using a common key generation method according to the first embodiment.

FIG. 1 is a view showing the general configuration of a node using a common key (i.e. secret key) generation method according to a first embodiment. Nodes 1 and 2 include switches (SW) 10 and 30 exposed to the outside, respectively. By plural collisions of switches 10 and 30 of nodes 1 and 2, nodes 1 and 2 generate shared information based on the time interval between switch-on operations. A process, which will be described later, based on the shared information, is performed to generate a common key. According to the first embodiment, switches 10 and 30 exposed to the outside are used. However, collision detectors may be installed within housings of the nodes to detect the time interval between collisions of the housings.

Here, the first embodiment is characterized as follows. In some cases, individual portions of sensor information detected by the nodes differ, even in an environment in which the same physical change is detected (e.g., in an environment in which the on-off timing of the switches by collision of the switches of the nodes is synchronized, as employed here), due to an error occurring on the occasion of a sampling process for the sensor information indicative of the detected physical change (e.g., the time interval between switch-on operations, as employed in this instance). Thus shared information (corresponding to a basic numeric string to be described later) generated based on the sensor information is partially different. In the first embodiment, if the error falls within a similar range to be described later, a common key to be used in both nodes can be generated based on the numeric string generated by one of the nodes.

Figure 2:
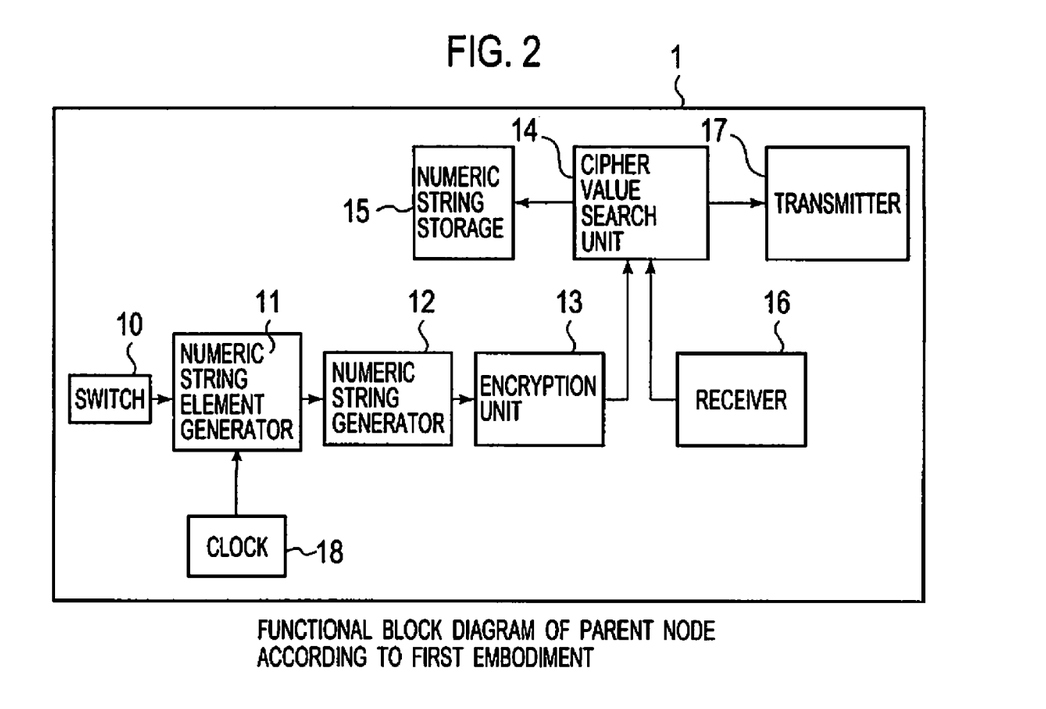
FIG. 2 is a functional block diagram of parent node 1 according to the first embodiment.

The following description assumes that node 1 is a parent node and node 2 is a child node. FIG. 2 is a functional block diagram of parent node 1 of a common key generation system, according to the first embodiment. Parent node 1 includes a microcomputer, and is configured of equipment capable of radio communication. Specifically, parent node 1 is assumed to be, for example, small-sized equipment used in an apparatus such as a microwave oven, an air conditioner, a burglar sensor, a television or a remote control. Then, parent node 1 includes switch 10, numeric string element generator 11, numeric string generator 12, encryption unit 13, encryption value search unit 14, numeric string storage 15, receiver 16, transmitter 17, and clock 18.

Numeric string element generator 11 observes time intervals between turn-on operations of switch 10 by collision, based on clock 18. Then, numeric string element generator 11 generates one or more numeric string elements (below embodiment is explained as a plurality of numeric string elements) from the observed time interval values respectively in accordance with a preset predetermined numeric string element generation rule, and outputs the numeric string elements to numeric string generator 12.

Numeric string generator 12 generates a basic numeric string, which is plural numeric string elements inputted from numeric string element generator 11. Then, numeric string generator 12 generates one or more numeric strings (below embodiment is explained as a plurality of similar numeric strings), each of which is formed of and is similar to the generated basic numeric string, and outputs the similar numeric strings with the basic numeric string to encryption unit 13. Here, plural similar numeric strings are generated by substituting the value of each digit of the basic numeric string with different value in accordance with a predetermined substitution rule.

Encryption unit 13 encrypts the group of numeric strings inputted from numeric string generator 12 according to a predetermined encryption rule, generates an encryption value list stored in correspondence with an encryption value, and outputs the encryption value list to encryption value search unit 14.

Receiver 16 acts as a processor that receives a signal transmitted from child node 2. On receipt of an encryption value to be described later from child node 2, receiver 16 outputs the encryption value to encryption value search unit 14.

Encryption value search unit 14 makes a comparison between the encryption value list inputted from encryption unit 13 and the encryption value from child node 2 inputted from receiver 16, and finds whether the encryption value that matches the encryption value from child node 2 is present in the encryption value list. If the matching encryption value is present, encryption value search unit 14 stores in numeric string storage 15 a numeric string in the encryption value list corresponding to the matching encryption value as the numeric string capable of being shared by parent node 1 and child node 2, and sends a match signal, to child node 2 via transmitter 17, indicating that there is a match in the result of comparison.

Figure 3:
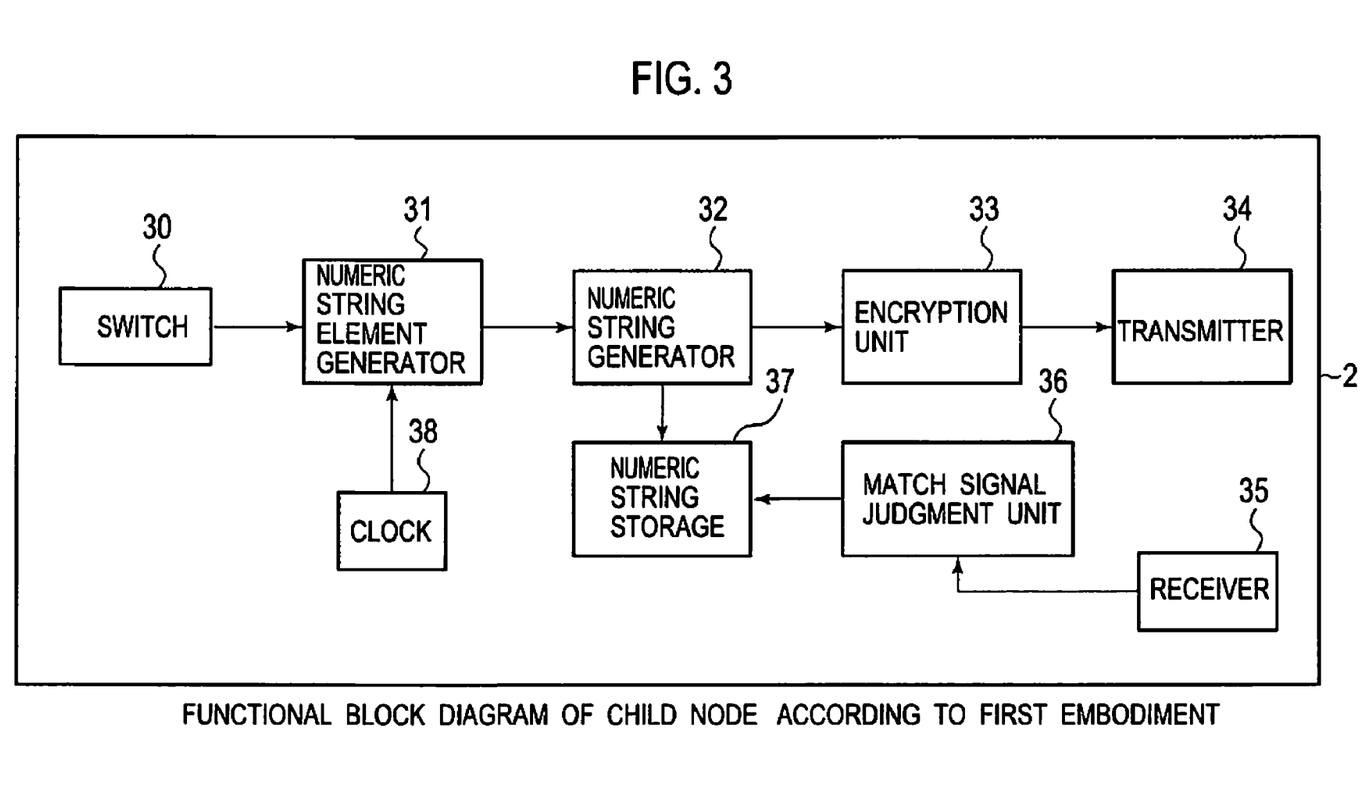
FIG. 3 is a functional block diagram of child node 2 according to the first embodiment.

FIG. 3 is a functional block diagram of child node 2 of the common key generation system according to the first embodiment. As in the case of parent node 1, child node 2 includes a microcomputer, and child node 2 is configured of equipment capable of communication. Specifically node 2 is assumed to be, for example, small-sized built in equipment such as a microwave oven, an air conditioner, a burglar sensor, a television or a remote control. Child node 2 includes switch 30, numeric string element generator 31, numeric string generator 32, encryption unit 33, transmitter 34, receiver 35, match signal judgment unit 36, numeric string storage 37, and clock 38.

As in the case of parent node 1, numeric string element generator 31 observes the time intervals between turn-on operations of switch 10 by collisions, based on clock 18. Then, numeric string element generator 31 generates numeric string elements from the observed time interval values respectively in accordance with a preset predetermined numeric string element generation rule, and outputs the numeric string elements to numeric string generator 32.

Numeric string generator 32 generates a basic numeric string in which a plural numeric string elements inputted from numeric string element generator 31 are arranged, and outputs the basic numeric string to encryption unit 33.

Encryption unit 33 encrypts the basic numeric string generated by numeric string generator 32 in accordance with the same predetermined encryption rule as employed in parent node 1, and transmits it to parent node 1 via transmitter 34.

Receiver 35 is a processor that receives a signal transmitted from parent node 1, and outputs the received signal to the match signal judgment unit 36.

Match signal judgment unit 36 judges whether a match signal is present or absent in the signal from parent node 1 as received by receiver 35. If the match signal is received, match signal decision unit 36 records, in numeric string recorder 37, the basic numeric string generated by numeric string generator 32 as the numeric string capable of being shared. Here, the match signal from parent node 1 indicates that the encryption value transmitted from child node 2 to parent node 1 matches the encryption value in the encryption value list held by parent node 1, and indicates that the numeric string corresponding to the matching encryption value can be used as a common key, as described above.

Figure 4:
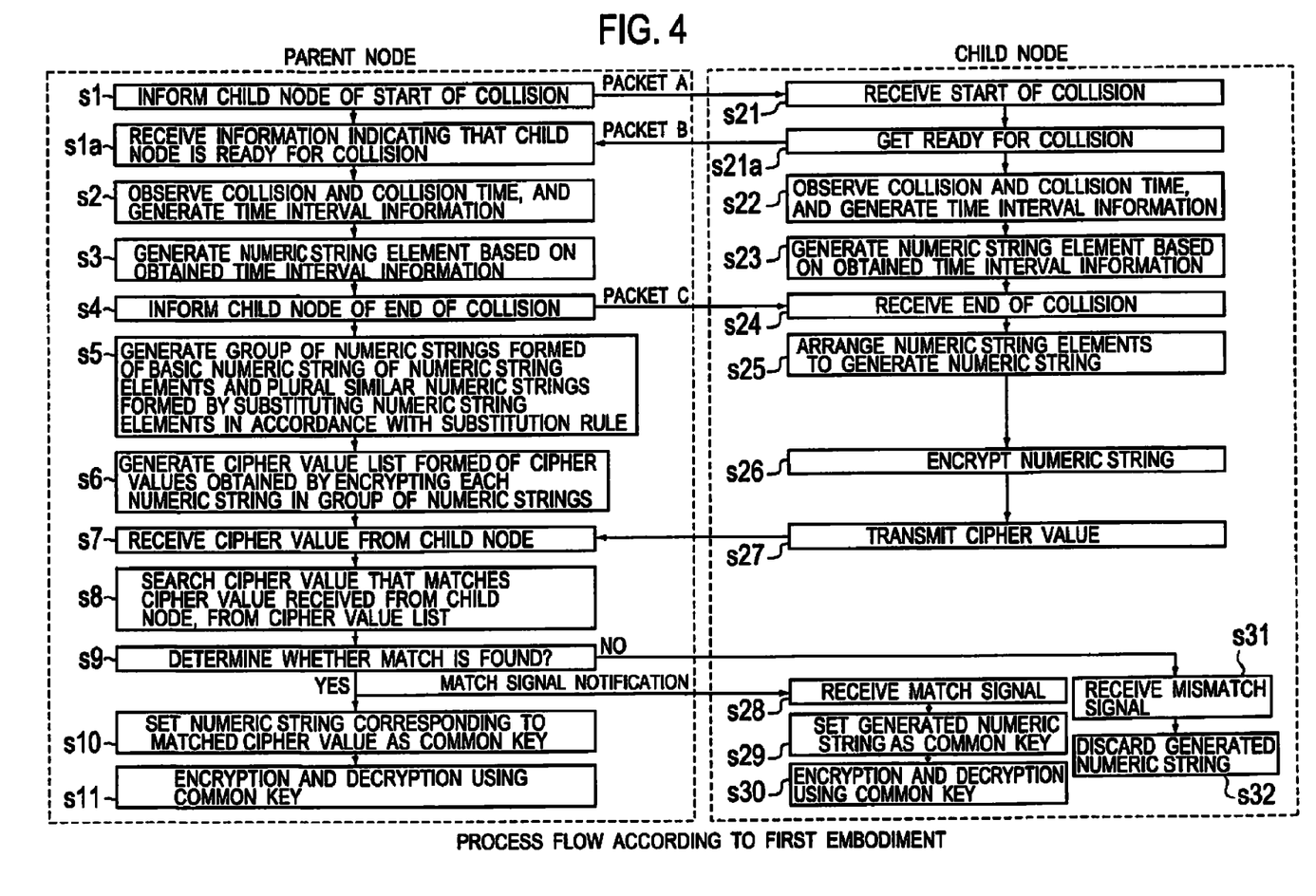
FIG. 4 is a process flow according to the first embodiment.

FIG. 4 shows a process flow, according to the first embodiment, along which parent node 1 and child node 2 generate a common key by collisions between switch 10 of parent node 1 shown in FIG. 2 and switch 30 of child node 2 shown in FIG. 3.

Figure 5:
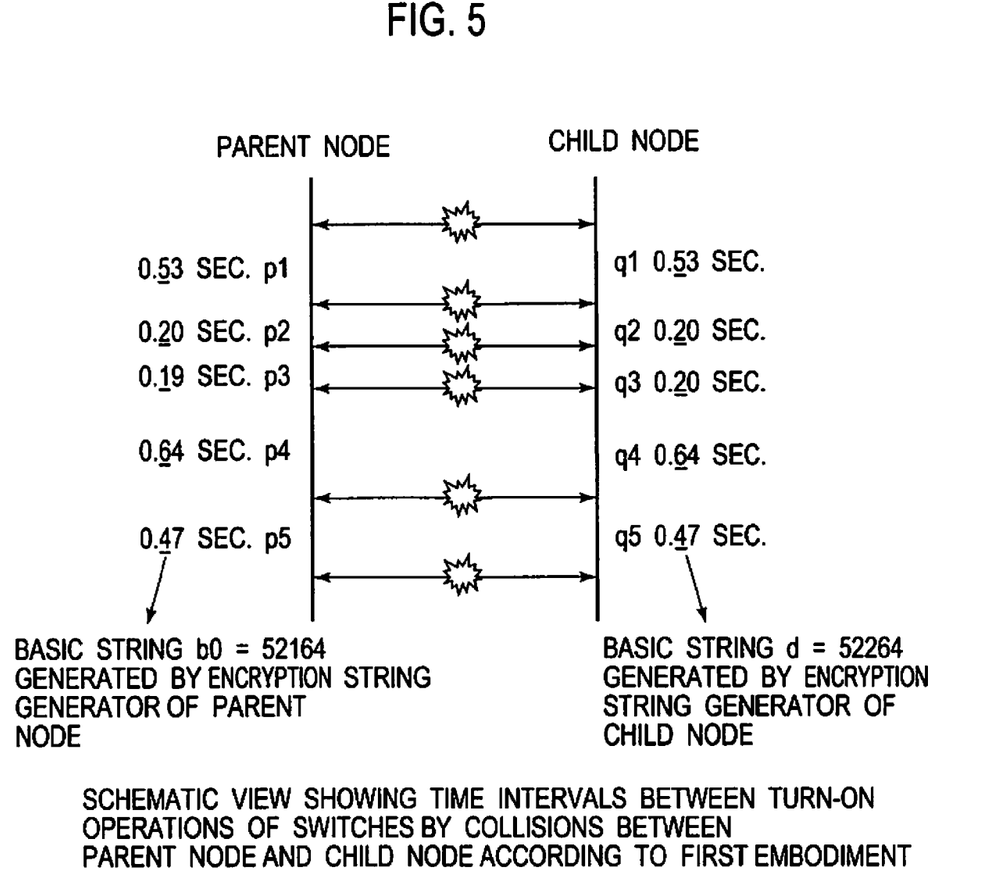
FIG. 5 is a schematic view showing a time interval between turn-on operations of switches 10 and 30 by collision between parent node 1 and child node 2 according to the first embodiment.

FIG. 5 illustrates in schematic form the time intervals between "on" operations of switch 10 and switch 30 performed by collisions between parent node 1 and child node 2, according to the first embodiment. FIG. 5 shows an instance where six collisions occur and five pieces of sensor information (i.e., time interval values) p1 to p5 are obtained. It is noteworthy that there can possibly be a difference between the time interval values observed by numeric string element generators 11 and 31 of parent node 1 and child node 2, depending on an accuracy error between clocks 18 and 38 of parent node 1 and child node 2. If there is a minor error between clocks 18 and 38 of parent node 1 and child node 2, the difference falls within extremely narrow limits; however, it is difficult to expect that the time interval values of parent node 1 and child node 2 match completely, allowing also for an error in a peripheral electronic component. FIG. 5, shows a situation where the third measured time interval values of parent node 1 and child node 2 differ due to error between the clocks.

Description will be given below with regard to the operation of the process flow shown in FIG. 4 with reference to FIG. 5, in sequence starting from step s1. First, parent node 1 transmits to child node 2, packet A that informs child node 2 of the start of collision (step s1).

Figure 6:
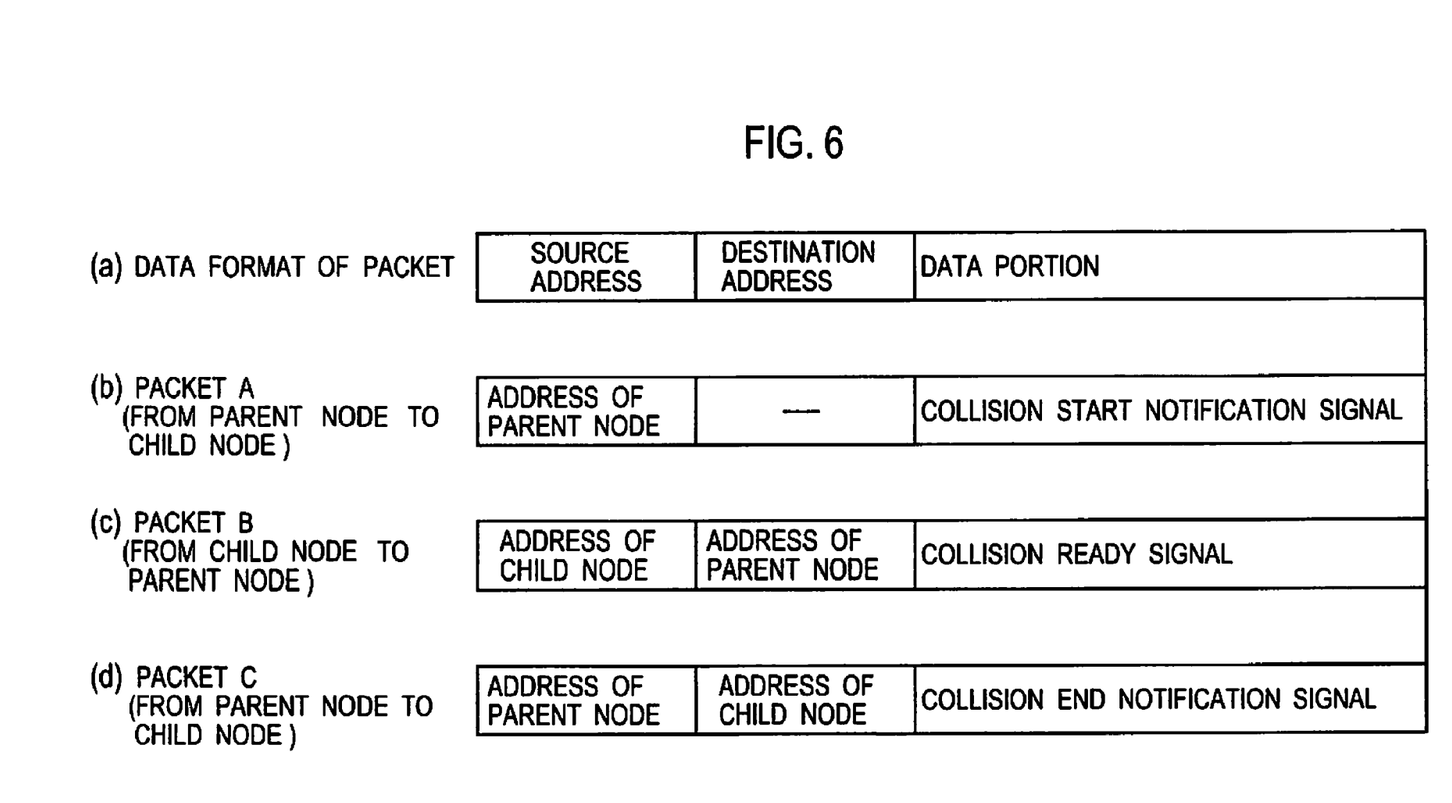
FIG. 6 is an illustration of packets.

FIG. 6 shows a data format of the packet and packets A to C transmitted between parent node 1 and child node 2. As shown in FIG. 6, a packet is configured of a "source address," a "destination address," and a "data portion." In packet A transmitted from parent node 1 to child node 2 at step s1, a parent node address is set in the "source address," nothing is set in the "destination address" (or equivalently, broadcast communication is set), and a collision start notification signal in a predetermined form, which indicates the start of collision, is set in the "data portion."

Then, when receiver 35 receives packet A (indicating the start of collision) (at step s21), child node 2 analyzes the data portion of received packet A. If the collision start notification signal in the predetermined form is contained in packet A, child node 2 recognizes that the node (namely, parent node 1 as employed here) specified by the "source address" informs child node 2 of the start of collision. Then, child node 2 transmits, to parent node 1, packet B that informs parent node 1 that child node 2 is ready for collision, and child node 2 is ready for collision (step s21a). As shown in FIG. 6, in packet B, a child node address is set in the "source address," the parent node address is set in the "destination address," and a collision ready signal in a predetermined form, indicating that child node 2 is ready for collision, is set in the "data portion." Incidentally, if being ready for collision, child node 2 may use an alarm (not shown) provided in child node 2 to inform a user that child node 2 is ready for collision.

If receiver 16 receives packet B (a collision ready notification) from child node 2 within a defined time after transmission of packet A (at step s1a), parent node 1 enters a collision ready state. As well as in child node 2, if being ready for collision, parent node 1 may use an alarm (not shown) provided in parent node 1 to inform a user that parent node 1 is ready for collision.

Then, the user brings switch 10 of parent node 1 and switch 30 of child node 2 into plural collisions with each other. Every time a collision occurs, numeric string element generator 11 of parent node 1 observes the times at which switch 10 is turned on and off. Here, the time interval between "on" operations of the switch at the time of collision is observed. As shown in FIG. 5, the time interval values (0.53 second, 0.20 second, 0.19 second, 0.64 second, and 0.47 second), are obtained from parent node 1 (at step s2), while the time interval values (0.53 second, 0.20 second, 0.20 second, 0.64 second, and 0.47 second), are obtained from child node 2 (at step s22). Then, as mentioned above, the third measured time interval values of parent node 1 and child node 2 are different.

Numeric string element generator 11 of parent node 1 generates numeric string elements from the obtained time interval values in accordance with a predetermined rule (hereinafter called a numeric string element generation rule) (step s3). Here, as an example of the numeric string element generation rule, each numeric string element is defined as a numeric value extracted from one of the time intervals at its preset significant digit (here, set as the first decimal place). Incidentally, 0 is omitted. Thus, the numeric string elements obtained here are '5, 2, 1, 6, 4.' The numeric string element generation rule is shared in advance by parent node 1 and child node 2, and, also in child node 2, numeric string element generator 31 performs the same process to generate '5, 2, 2, 6, 4' as the numeric string elements (step s23).

In order for parent node 1 and child node 2 to complete the collision observation, parent node 1 transmits, to child node 2, packet C that informs child node 2 of the completion of collision (step s4), and child node 2 receives packet C (step s24).

After transmission of packet C that informs child node 2 of the completion of collision, parent node 1 generates a group of numeric strings formed of a basic numeric string b0 (here, '5 2 1 6 4' is obtained as the basic numeric string b0 as shown in FIG. 5) generated by arranging the numeric string elements generated by numeric string element generator 11 in generation time order, and plural similar numeric strings generated by substituting the numeric string elements of the generated basic numeric string b0 with different numeric string elements in accordance with a predetermined substitution rule (hereinafter called a numeric string element substitution rule) (step s5).

The numeric string element substitution rule is the rule that involves substituting the least significant digit of each of the numeric string elements of the generated basic numeric string with a value obtained by incrementing or decrementing the digit by a preset predetermined value x (x=1, 2, ..., n). Incidentally, in this instance, all numeric string elements are one-digit values, and thus, the least significant digit is the value in itself. However, for example if numeric string elements are two-digit values, the ones digit is the least significant digit.

Here, if "n" is set equal to 1 (n=1), each of the numeric string elements are substituted by a value incremented or decremented by 1, and thus, plural similar numeric strings are generated as given below.
b1='52163'
b2='52165'
b3='52154'
b4='52174'
b5='52064'
b6='52264'
b7='51164'
b8='53164'
b9='42164'
b10='62164'

Here, these plural similar numeric strings (b1 to b10) and a set of numeric strings including the original basic numeric string b0 are called a group of numeric strings (b0 to b10) for the sake of convenience.

On the other hand, after child node 2 receives Packet C indicating the completion of collision from parent node 1 (step s24), child node 2 generates, in numeric string generator 32, a basic numeric string "d" which includes the numeric string elements generated by numeric string element generator 31 arranged in order. Here, '52264' is obtained as basic numeric string "d", as shown in FIG. 5 (step s25).

Figure 7:
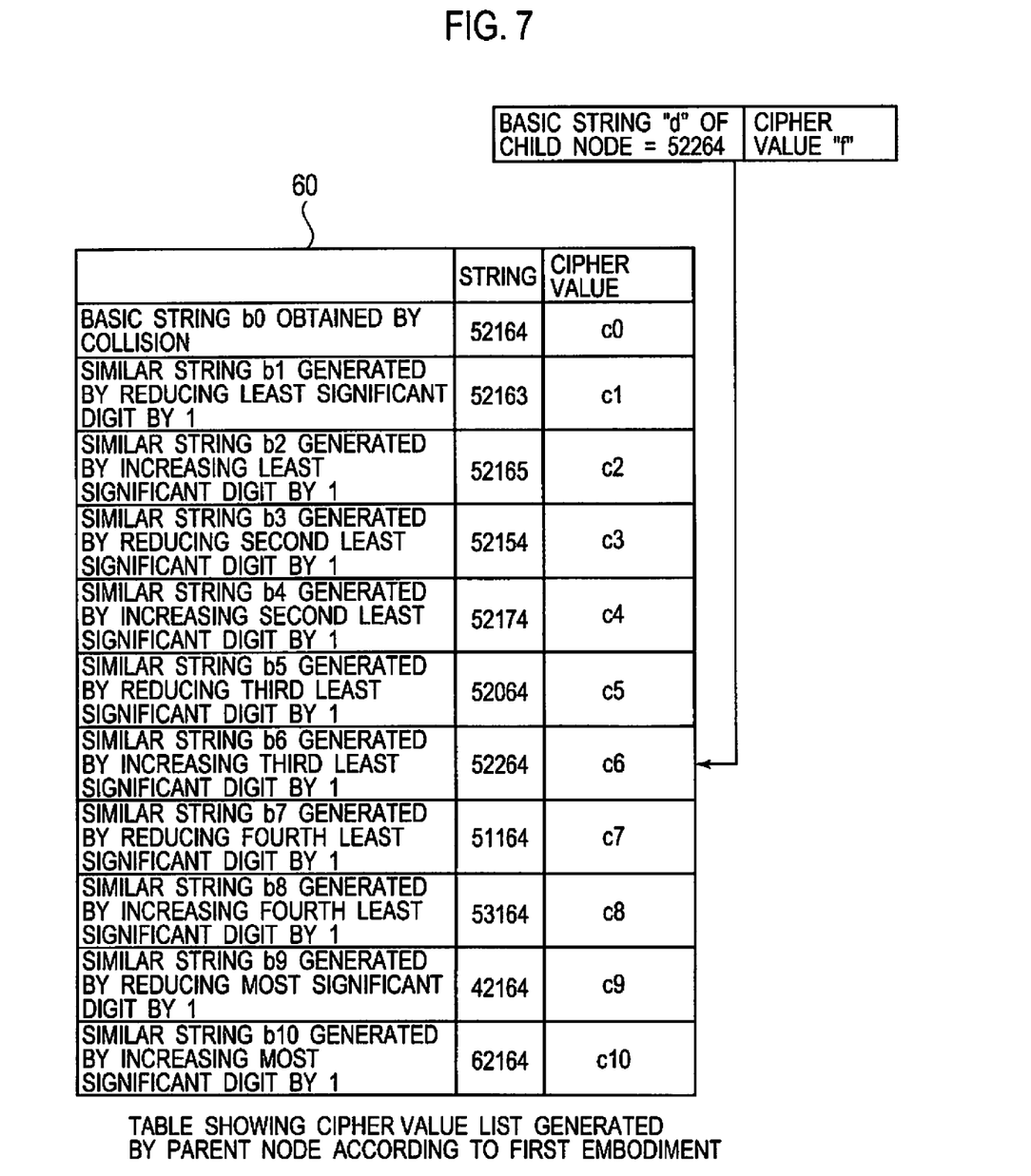
FIG. 7 is table showing encryption value list 60 generated by parent node 1 according to the first embodiment.

Parent node 1 encrypts each numeric string in a group of numeric strings (b0 to b10) generated by numeric string generator 12 in encryption unit 13, to generate cipher value list 60 (step s6). FIG. 7 shows cipher value list 60 generated by encryption unit 13.

FIG. 7 shows cipher value list 60 generated by parent node 1 according to the first embodiment. Cipher value list 60 is configured to record numeric strings b0 to b10 in correspondence with cipher values c0 to c10, respectively.

On the other hand, also in child node 2, encryption unit 33 uses the same encryption rule as that for parent node 1 to encrypt basic numeric string "d" (step s26) to generate cipher value "f". Then, cipher value f is transmitted from transmitter 34 to parent node 1 (step s27). Incidentally, examples of the encryption rule include a hash function operation that is a one-way function.

Parent node 1 receives cipher value "f" from child node 2 (step s7). Here, data communicated between parent node 1 and child node 2 are in their encoded (cipher) forms, and thus, numeric string "d" generated by child node 2 is not leaked to a third party.

Cipher value search unit 14 of parent node 1 compares cipher value "f" received from child node 2 with cipher values c0 to c10 in cipher value list 60, to search whether a matching cipher value is present (step s8). Then, if a cipher value that matches cipher value "f" is present in cipher value list 60 (step s9), the numeric string corresponding to the cipher value is selected from cipher value list 60 and is stored in numeric string recorder 15 as the numeric string capable of being shared.

In this instance, in FIG. 7, cipher value "f" corresponding to basic numeric string "d" of child node 2 matches the cipher value c6 in cipher value list 60. Since the same encryption rule is applied in both parent node 1 and child node 2, when the basic numeric string of child node 2 is the same as the numeric string in cipher value list 60, the cipher values for them also match. Therefore, in this instance, cipher value "f" matches cipher value c6 in cipher value list 60, and numeric string b6 '52264' corresponding to cipher value c6 is selected as numeric string capable of being shared. Then, parent node 1 transmits a match signal from transmitter 17 to child node 2.

Parent node 1 recognizes that the numeric string b6, which is one of the similar numeric strings, corresponding to cipher value c6 (step s10) is the common key, and thereafter parent node 1 and child node 2 carry out cipher communication using the common key (step s11).

On the other hand, if child node 2 receives the match signal from parent node 1 (step s28), child node 2 determines that the same numeric string (corresponding to similar numeric string b6 in parent node 1) as basic numeric string "d" generated by numeric string generator 32 is shared by parent node 1, and child node 2 stores basic numeric string "d" in numeric string recorder 37, in order to use basic numeric string "d" as the common key (step s29). Thereafter, parent node 1 and child node 2 carry out cipher communication using the common key (step s30).

Incidentally, if a match is not found at step s9, parent node 1 adjudges the generation of the common key to be a failure, completes the processing, and transmits a mismatch signal to child node 2. When child node 2 receives the mismatch signal (step s31), it determines that basic numeric string "d" could not be recognized by parent node 1 as the sharable numeric string, discards the generated basic numeric string "d" (step s32), and completes the processing.

Also, it is assumed that the numeric string element generation rule and the encryption rule are shared in advance by parent node 1 and child node 2, as described above. The rules may be preset in another means before the start of the process flow, or parent node 1 may transmit information on the rules to child node 2 during the above process flow s1.

As described above, in the first embodiment, the basic numeric string is generated based on the numeric string elements generated from plural time interval values, and the similar numeric strings are generated by incrementing or decrementing the value of the least significant digit of each of the numeric string elements by the predetermined value. These generated similar numeric strings are judged as a similar range of the original basic numeric string generated from the time interval values. Thus, even in a case where the basic numeric string generated from the time interval values by parent node 1 does not match the basic numeric string generated by child node 2, if any one of plural similar numeric strings within the similar range matches the basic numeric string generated by child node 2, the matching basic numeric string can be used as the common key. Therefore, even if the basic numeric strings generated by parent node 1 and child node 2 are partially different due to an error occurring in the sampling process for the time interval values of parent node 1 and child node 2, the common key can be generated.

Also, the cipher value generated by encrypting the basic numeric string is used to pass the basic numeric string generated by child node 2 to parent node 1. Thus, a numeric string candidate does not leak to a third party.

Also, in the first embodiment, both parent node 1 and child node 2 are disposed in an environment in which the same change in physical phenomenon is detected, and the common key is generated based on plural time interval values at which a predetermined change is detected. Compared with the situation where separate changes in physical phenomenon are made in parent node 1 and child node 2, this enables an improvement in the matching accuracy of original data (i.e., measured time values) for generating a common key and hence enables improved generation accuracy of the common key.

Incidentally, a similar range can be arbitrarily set by parent node 1, and the value of "n" that determines the range of the predetermined value "x" may be increased for further enlargement of the similar range. Specifically, for example if "n" is set to 3, in addition to the numeric strings generated by incrementing or decrementing the numeric string elements by "1", the numeric strings generated by incrementing or decrementing the numeric string elements by "2" and by "3", are also used as the similar numeric strings. Thus, the similar range can be enlarged.

Second Embodiment

Although the first embodiment uses the time interval value (or the length of time) as original data for basic numeric string generation, the second embodiment uses a time ratio as the original data and further adopts a numeric string element generation rule and a numeric string element substitution rule that are distinct from those for the first embodiment.

The configurations of parent node 1 and child node 2 according to the second embodiment are the similar to those for the first embodiment. Also, as compared with that shown in FIG. 4, the process flow is different in steps s3 (s23) and s5 (s25) but is the similar in others. Further, the collisions between parent node 1 and child node 2 of the second embodiment are the same as those in the case of the first embodiment.

Description will be given below with regard to steps s3 (s23) and s5 (s25), which are the process steps that differ from those in the second embodiment from the first embodiment. At step s3, as in the case of the first embodiment, numeric string element generator 11 obtains a plural time interval value, and calculates a ratio (or a time ratio) between all pairs of adjacent time interval values. Here, assuming that the first time interval value is $p_1$, the second time interval value is $p_2$, and thereafter the nth time interval value is $p_n$, the ratios (or the time ratios) between the adjacent time interval values are $t_1, t_2, \ldots,$ and $t_n$.

$$t_1 = p_2/p_1$$

$$t_2 = p_3/p_2$$

$$\ldots$$

$$t_n = p_{n+1}/p_n$$

In this instance, the ratios are as follows.

$$t_1 = 0.20/0.53 = 0.3$$

$$t_2 = 0.19/0.20 = 0.9$$

$$t_3 = 0.64/0.19 = 3.3$$

$$t_4 = 0.47/0.64 = 0.7$$

Then, the numeric string element generation rule that varies a binary number in accordance with the magnitude of the time ratio $t_n$ is predefined in numeric string element generator 11, and the numeric string element generation rule is applied to obtain the numeric string elements.

Figure 8:
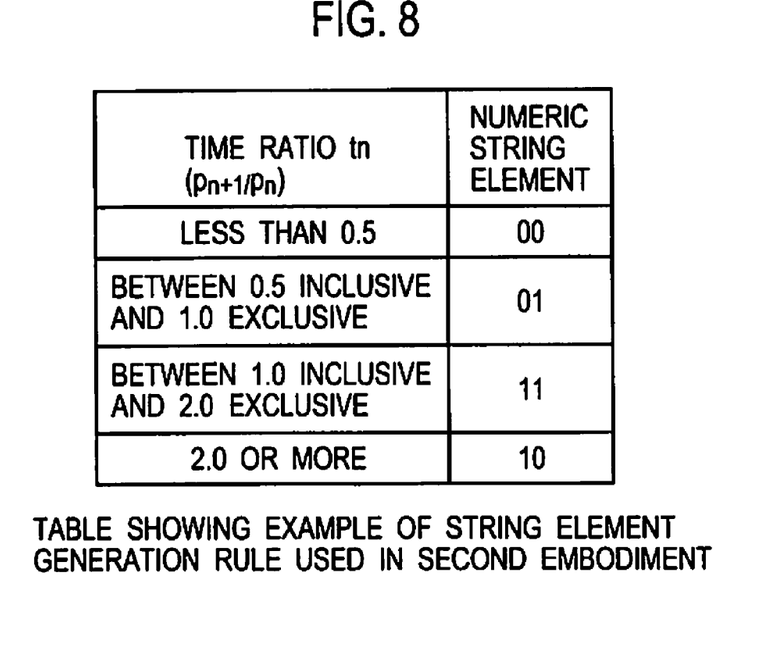
FIG. 8 is a table showing an example of a numeric string element generation rule used in the second embodiment.
Figure 9:
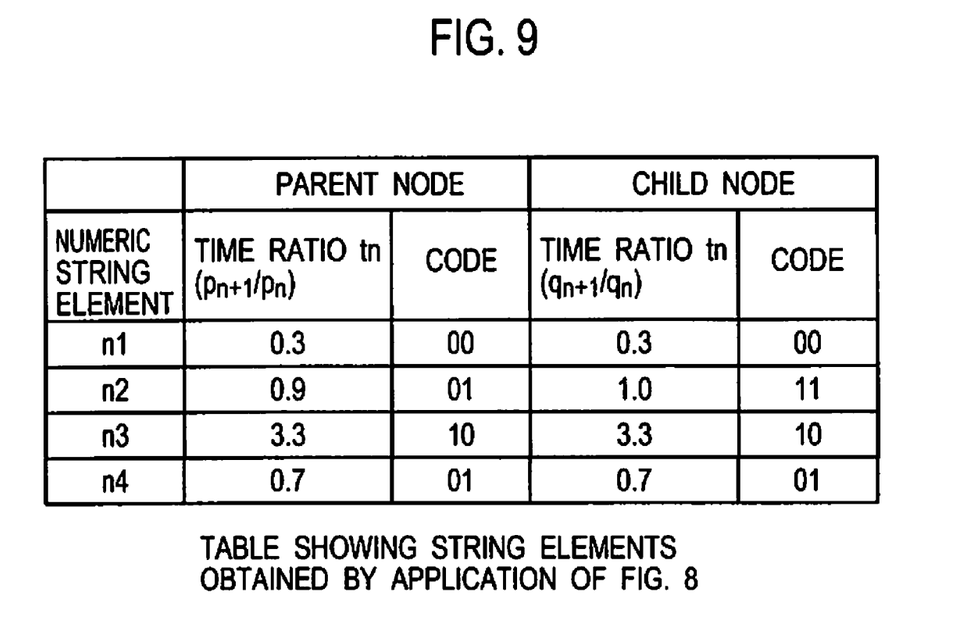
FIG. 9 is a table showing numeric string elements obtained by the example of FIG. 8.

FIG. 8 is a table that exemplifies the numeric string element generation rule for use in the second embodiment, and FIG. 9 is a table showing the numeric string elements obtained by the application of the numeric string element generation rule shown in FIG. 8. The numeric string element generation rule according to the second embodiment involves dividing the time ratio into predetermined ranges, and assigning each of the numeric string elements to the corresponding range. The numeric string element generation rule is characterized by using a Gray code conversion method. In a Gray code conversion method, if a comparison between adjacent numeric string elements is made for each digit, the numeric string elements are different only in one place.

When the above numeric string element generation rule using the Gray code conversion method is used, the numeric string elements (or binary numbers) $n_1, n_2, n_3$ and $n_4$ obtained by applying the above-mentioned time ratios $t_1, t_2, t_3$ and $t_4$ are 00, 01, 10 and 01, respectively (see FIG. 9).

Then, numeric string element generator 31 of child node 2 also performs the same processes as step s23 in step s3. As a result, the numeric string elements 00, 11, 10 and 01 are obtained.

Figure 11:
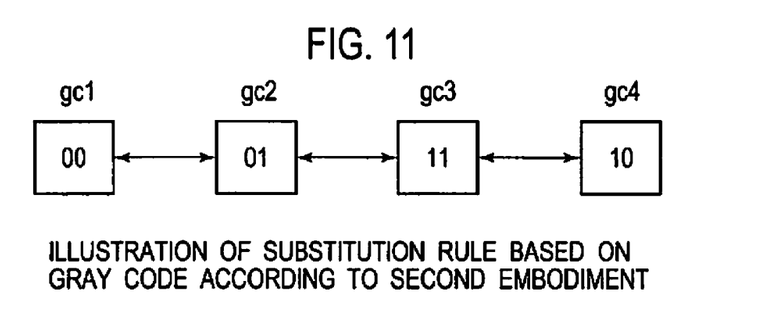
FIG. 11 is an illustration of a substitution rule based on gray code according to the second embodiment.

The numeric string element substitution rule is now described. This is the rule that involves substituting one of plural numeric string elements generated by numeric string element generator 11, with the numeric string element that is an adjacent code in accordance with the Gray code. This is shown in FIG. 11, and the numeric string element is substituted only with the adjacent numeric string element in the following manner: the numeric string element 00 is substituted with the numeric string element 01; the numeric string element 01 is substituted with the numeric string element 00 or 11; the numeric string element 11 is substituted with the numeric string element 01 or 10; and the numeric string element 10 is substituted with the numeric string element 11.

Moreover, a group of numeric strings consisting of basic numeric string bb0 generated by arranging in time sequence the numeric string elements generated by numeric string element generator 11 (here, '00011001' is obtained as the basic numeric string bb0), and plural similar numeric strings generated by substituting, in accordance with the above-mentioned numeric string element substitution rule, the numeric string elements that constitute the basic numeric string bb0 with different numeric string elements is generated (step s5). The numeric string elements (or binary numbers) are 00, 01, 10 and 01, so that the following similar numeric strings are generated.

bb1 = '00011000'
bb2 = '00011011'
bb3 = '00011101'
bb4 = '00001001'
bb5 = '00111001'
bb6 = '01011001'

Here, a set of numeric strings containing these plural similar numeric strings (bb1 to bb6) and the original basic numeric string bb0 is referred to as a group of numeric strings (bb0 to bb6).

On the other hand, child node 2 generates basic numeric string "dd" by arranging the numeric string elements generated by numeric string element generator 31 (step s25). Here, the following is obtained as the basic numeric string "dd".
dd = 00111001

Figure 10:
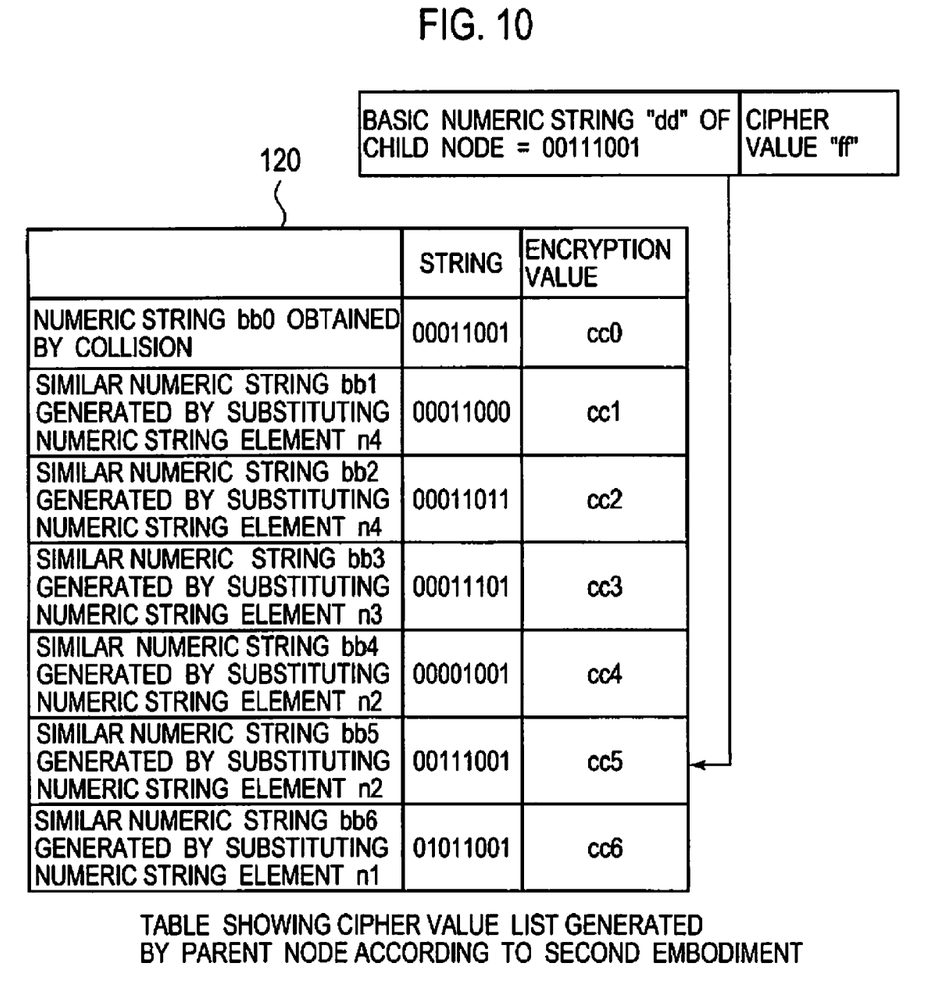
FIG. 10 is a table showing encryption value list 120 generated by parent node 1 according to the second embodiment.

Although the following process is similar to that of the first embodiment, description will be given with regard to a cipher value search process at step s8 for the sake of assistance in understanding. Cipher value search unit 14 of parent node 1 compares cipher value "ff" received from child node 2 with cipher values cc0 to cc6 in cipher value list 120 to search whether a match exists. In this instance, in FIG. 10, the cipher value "ff" corresponding to the basic numeric string "dd" of child node 2 should match the cipher value cc5 of cipher value list 120. The reason is that parent node 1 and child node 2 use the same encryption rule, and thus, if the basic numeric string "dd" of child node 2 is the same as the numeric string in cipher value list 60, the cipher values also match each other. Therefore, here, there is a match between the cipher value "ff" of child node 2 and the cipher value cc5 of cipher value list 120, both having the numeric string '00111001.'

Incidentally, here, the numeric string element is 2 bits long. However, in some cases, it is preferable to use a longer bit numeric string. The reason is that the second embodiment uses a sharable numeric string as the numeric string element and uses the numeric string as the common key, and thus, longer original information for key generation can provide a higher level of security for common key cryptography. In the second embodiment, a method for increasing the length of key is to increase the number of collisions. However, besides that, the numeric string elements may be elongated by implementation of other method.

Figure 12:
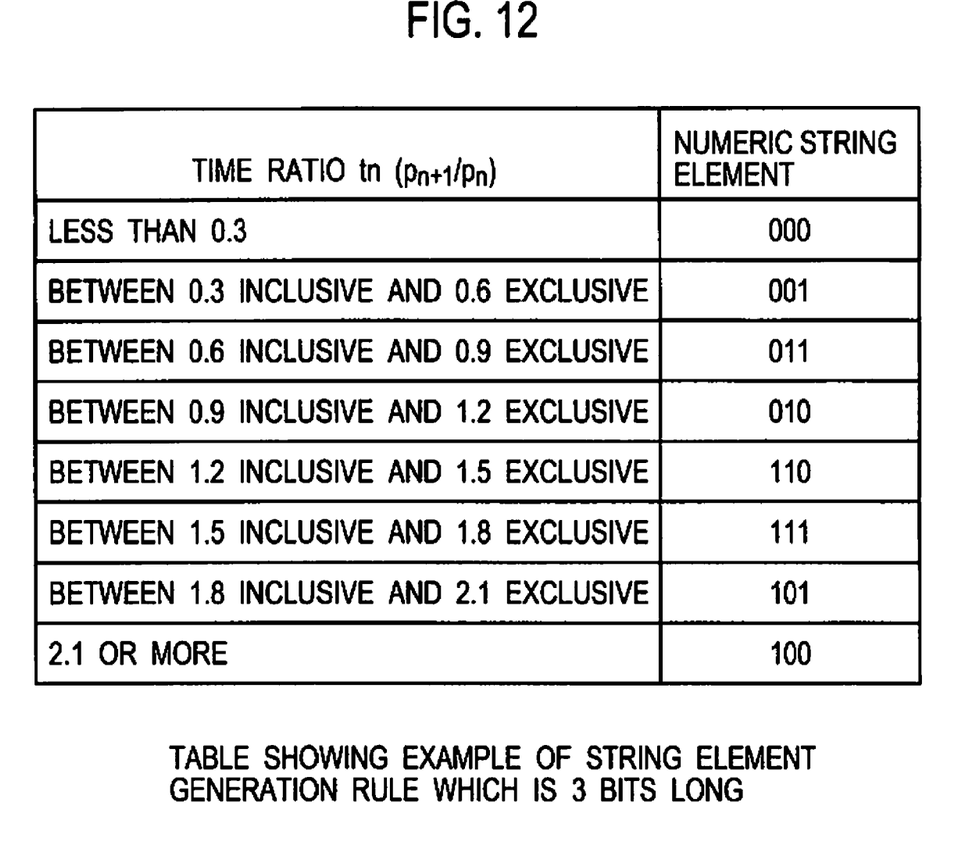
FIG. 12 is a table showing an example of a numeric string element generation rule that is 3 bits long.

FIG. 12 is a table showing an example of a numeric string element generation rule of a longer bit length. In this instance, the numeric string elements are each composed of 3 bits. Incidentally, also in the second embodiment, it is assumed that the numeric string element generation rule and the encryption rule are shared in advance by parent node 1 and child node 2, as in the case of the first embodiment.

As described above, according to the second embodiment, the numeric string elements are generated from plural time ratios, each of the numeric string elements is substituted with an adjacent code in accordance with the Gray code to thereby generate plural similar numeric strings. These generated similar numeric strings are judged as the similar range of the original basic numeric string generated from the time interval values. Thus, even in a case where the basic numeric string generated from the time interval values by parent node 1 does not match the basic numeric string generated by child node 2, if any one of plural similar numeric strings within the similar range matches the basic numeric string generated by child node 2, the matching basic numeric string that matches the basic numeric string generated by child node 2 can be used as the common key. Therefore, even if the basic numeric strings generated by parent node 1 and child node 2 are partially different due to an error occurring in the sampling process for the time interval values of parent node 1 and child node 2, the common key can be generated.

Incidentally, in the above embodiments, the numeric string in itself is used as the common key. However, a value obtained by encrypting the numeric string in accordance with the encryption rule common to parent node 1 and child node 2 may be used as the common key.

The present invention is technically characterized by the numeric string element generation rule for use in numeric string element generator 11 (or 31) of parent node 1 (or child node 2), and the numeric string element substitution rule for use in numeric string generator 12 of parent node 1. Different rules are defined for the first and second embodiments, but the rules are not limited to this.

Also, the hash function operation that is the one-way function is given as an example of the encryption rule. However, the encryption rule is not limited to this, and any method may be used, provided that it does not leak the transmitted numeric string to a third party.

Recently, an inexpensive vibration sensor is commercially available, and there has been an instance where the vibration sensor is attached to a mobile telephone or a sensor node. In this instance, the vibration sensor rather than the switch is attached to the node, and the nodes are brought into collision with each other, and thereby, the same advantageous effect as that of the present invention is achieved. This enables generating a common key between the mobile telephone and the sensor node with simplicity, and thus enables achieving short-distance radio communication between the mobile telephone and the sensor node with safety.

By referring to the above embodiments, the physical change has been described as the press of the switch caused by collision. However, the physical change is not limited to this but may be a change in any one of light, sound, wind power, temperature and humidity. For example, if the temperature is used, a sensor that detects the temperature may be provided in each of the nodes. Here, the temperature of an environment in which the nodes are installed is for example forcedly changed, and the time interval between the times at which plural preset predetermined temperatures are reached is obtained.

Also, in the above embodiments, parent node 1 and child node 2 have separate functions. However, one node may have both functions.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. A common key generation system comprising:
  a first node including: a numeric string element generator configured to generate one or more numeric string elements from time interval information of a physical change in the first node;
  wherein the physical changes comprise at least one of changes in light, sound, wind power, temperature or humidity; a numeric string generator configured to generate a basic numeric string from the one or more numeric string elements and substitute the basic numeric string with one or more similar numeric strings; an encryption unit configured to encrypt the basic numeric string and the one or more similar numeric strings and to generate a cipher value list of the numeric strings in correspondence with their cipher values; and a match signal judgment unit configured to search a received cipher value from the cipher value list; and
  a second node including: a numeric string element generator configured to generate one or more numeric string elements from time interval information of a physical change in the second node;
  wherein the physical changes comprise at least one of changes in light, sound, wind power, temperature or humidity;
  a numeric string generator configured to generate a basic numeric string from the one or more numeric string elements;
  an encryption unit configured to encrypt the basic numeric string in accordance with the encryption rule, which is common to that for the first node; and
  a transmitter configured to transmit the generated cipher value to the first node, which is recognized as the received cipher value at the first node,
  wherein the match signal judgment unit searches for the cipher value transmitted from the transmitter of the second node, and a common key is generated based on the result of the search.

2. A common key generation system for cipher communication, comprising:

a first node including: a numeric string element generator configured to detect time intervals between physical changes made to the first node in time series, wherein the physical changes comprise at least one of changes in light, sound, wind power, temperature or humidity, and generates one or more numeric string elements from the detected time interval values in accordance with a predetermined numeric string element generation rule;

a numeric string generator configured to generate a basic numeric string from the one or more numeric string elements generated by the numeric string element generator, and to generate one or more similar numeric strings by incrementing or decrementing, by a predetermined value x (where x=1, 2, ..., n), the least significant digit of each numeric string element that constitutes the basic numeric string;

an encryption unit configured to encrypt each generated basic numeric string and one or more similar numeric strings and to generate a cipher value list that stores the numeric strings in correspondence with their cipher values; and a cipher value search unit configured to receive a cipher value, and compare the received cipher value with the cipher value list to determine a match in the cipher value list; and a transmitter configured to transmit a match signal upon finding a match;

and a second node including:

a numeric string element generator configured to detect a time interval between pairs of physical changes made to the first node in time series, wherein the physical changes comprise at least one of changes in light, sound, wind power, temperature or humidity, and to generate one or more numeric string elements from the detected time interval values in accordance with a predetermined numeric string element generation rule;

a numeric string generator configured to generate a basic numeric string from the one or more numeric string elements generated by the numeric string element generator;

an encryption unit configured to encrypt the generated basic numeric string into the cipher value in accordance with the same encryption rule as that for the first node;

a transmitter configured to transmit the cipher value to the first node; and a receiver configured to receive the match signal from the first node, wherein, when the cipher value search unit finds a match, the first node selects the basic numeric string generated by the first node as the common key, or, when the second node receives the match signal from the first node, the second node selects the basic numeric string generated by the second node as the common key.

3. The system according to claim 2, wherein the numeric string element generation rule defines one or more numeric string elements using numeric values from the most significant digit to a preset significant digit of each time interval value.

4. The system according to claim 2, wherein the numeric string generator generates the basic numeric string by arranging the one or more numeric string elements generated by numeric string element generator in generation time order.

5. A common key generation system, comprising:

a first node including:

a numeric string element generator configured to detect a time interval value between pairs of physical changes made to the first node in time series, wherein the physical changes comprise at least one of changes in light, sound, wind power, temperature or humidity, determine ratios between adjacent time interval values, and transform the ratios in accordance with a predetermined numeric coding rule to thereby generate one or more numeric string elements;

a numeric string generator configured to generate a basic numeric string from the one or more numeric string elements generated by the numeric string element generator, and to generate one or more similar numeric strings by substituting each numeric string element that constitutes the basic numeric string, with an adjacent sign in accordance with the numeric coding rule;

an encryption unit configured to encrypt the generated basic numeric string and the one or more similar numeric strings and to generate a cipher value list of one or more numeric strings with their cipher values;

a cipher value search unit configured to receive a cipher value, and to look for a match between the received cipher value and a cipher value in the cipher value list; and a transmitter configured to transmit a match signal when the cipher value search unit finds a match; and a second node including:

a numeric string element generator configured to detect a time interval value between pairs of physical changes made to the first node in time series, wherein the physical changes comprise at least one of changes in light, sound, wind power, temperature or humidity, to determine a ratio between adjacent time interval values, and to transform the time ratios in accordance with the predetermined numeric coding rule to thereby generate one or more numeric string elements;

a numeric string generator configured to generate a basic numeric string from the one or more numeric string elements generated by the numeric string element generator;

an encryption unit configured to encrypt the generated basic numeric string into the cipher value in accordance with the same encryption rule as that for the first node;

a transmitter configured to transmit the cipher value to the first node; and a receiver configured to receive the match signal from the first node, wherein, if the cipher value search unit finds a match in the first node, the first node selects the basic numeric string generated by the first node as the common key, or, if the second node receives the match signal from the first node, the second node selects the basic numeric string generated by the second node as the common key.

6. The system according to claim 5, wherein the numeric string element generator transforms the ratios in accordance with a predetermined numeric coding rule that varies a binary number in accordance with the magnitude of the time ratio.

7. The system according to claim 5, wherein the first and second nodes each comprise a detector configured to detect a physical collision, and the detector detects collisions between the nodes, in accordance with a preset pattern, and obtains time intervals between the detected collisions as the plurality of time interval values.

8. The system according to claim 6, wherein the one or more numeric string elements have plural bits long.

9. The system according to claim 8, wherein the one or more numeric string elements have two bits long.

10. The system according to claim 2, wherein the physical changes comprise changes in light, sound, wind power, temperature and humidity.

11. A common key generation method comprising the steps of:
- making physical changes in first and second nodes that are in communication; and
- executing a numeric string element generation process by which each of the first and second nodes generates one or more numeric string elements from time interval information on the changes; wherein the physical changes comprise at least one of changes in light, sound, wind power, temperature or humidity,
- wherein the first node:
- generates a basic numeric string from the one or more numeric string elements generated by the first node, and substitutes the basic numeric string with one or more similar numeric strings;
- encrypts the generated basic numeric string and one or more similar numeric strings, and generates a cipher value list that stores the numeric strings with corresponding cipher values;
- receives a cipher value from the second node of the first and second nodes, and compares the received cipher value with the cipher values in the cipher value list to find a match; and
- transmits a match signal to the second node and determines, as a common key, the numeric string corresponding to the cipher value matching the received cipher value, if a match is found; and
- the second node:
- generates a basic numeric string based on the one or more numeric string elements generated by the second node;
- encrypts the generated basic numeric string in accordance with the same encryption rule as that for the first node;
- transmits the generated cipher value to the first node; and
- selects the basic numeric string generated by the second node as the common key, if the second node receives the match signal from the first node.

12. A common key generation method, comprising the step of:
- making multiple physical changes between first and second nodes that are in communication, in time series, detecting time interval values of the changes in the first and second nodes, wherein the physical changes comprise at least one of changes in light, sound, wind power, temperature or humidity, and generating one or more numeric string elements from the time interval values detected by the first and second nodes, in accordance with a predetermined numeric string element generation rule;
- wherein the first node
- generates a basic numeric string from the one or more numeric string elements generated by the first node, and generates one or more similar numeric strings by incrementing or decrementing by a predetermined value x (where x=1, 2, . . . , n), the value of the least significant digit of each numeric string element that constitutes the basic numeric string;
- encrypts each generated basic numeric string and one or more similar numeric strings and stores the numeric strings in correspondence with cipher values in a cipher value list;
- receives a cipher value from the second node, and compares the received cipher value with the cipher values in the cipher value list to find a match; and
- transmits a match signal to the second node and selecting the numeric string corresponding to the matched cipher value as the common key, if a match is found; and
- the second node:
- generates a basic numeric string by arranging the one or more numeric string elements generated by the second node;
- encrypts the generated basic numeric string into the cipher value in accordance with the same encryption rule as that for the first node;
- transmits the cipher value to the first node;
- receives the match signal from the first node; and
- selects the basic numeric string generated by the second node as the common key, if the second node receives the match signal from the first node.

13. The method according to claim 12, wherein the numeric string element generation rule defines, as the one or more numeric string elements, numeric values from the most significant digit to a preset significant digit for each time interval value.

14. The method according to claim 12, wherein the first node generates the basic numeric string by arranging the one or more numeric string elements generated by numeric string element generator in generation time order.

15. A common key generation method comprising the steps of:
- making physical changes in first and second nodes that are in communication, in time series; detecting each time interval value of the changes by the first and second nodes, wherein the physical changes comprise at least one of changes in light, sound, wind power, temperature or humidity;
- calculating a ratio between pairs of adjacent time interval values for time interval values detected by the first and second nodes, the calculation performed in the first and second nodes; and
- transforming the time ratios in accordance with a predetermined numeric coding rule to thereby generate one or more numeric string elements;
- wherein the first node:
- generates a basic numeric string from one or more numeric string elements generated by the first node, and generating a plurality of one or more similar numeric strings by substituting each numeric string element that constitute the basic numeric string, with an adjacent sign in accordance with the numeric coding rule;
- encrypts each generated basic numeric string and one or more similar numeric strings and storing the numeric strings with corresponding cipher values in a cipher value list;
- receives a cipher value from the second node and compares the received cipher value with the cipher value list to find a match; and
- transmits a match signal to the second node and selecting as a common key, the numeric string corresponding to the cipher value matching the received cipher value, if a match has been made and
- the second node:
- generates a basic numeric string by arranging the one or more numeric string elements generated by the second node;
- encrypts the generated basic numeric string into the cipher value in accordance with the same encryption rule as that for the first node;
- transmits the generated cipher value to the first node;
- receives the match signal from the first node; and selects the basic numeric string generated by the second node as the common key, if the second node receives the match signal from the first node.

16. The method according to claim 15, wherein the first node transforms the ratios in accordance with a predetermined numeric coding rule that varies a binary number in accordance with the magnitude of the time ratio.

17. The method according to claim 15, wherein the first and second nodes each comprise a detector for detecting a physical collision between the nodes, the detector detects a plurality of collisions between the nodes in accordance with a preset pattern, and obtains time intervals between the collisions as the plurality of time interval values.

18. The method according to claim 16, wherein the one or more numeric string elements have plural bits long.

19. The method according to claim 18, wherein the one or more numeric string elements have two bits long.

* * * * *